(12) United States Patent
Kishiyama et al.

(10) Patent No.: US 11,677,521 B2
(45) Date of Patent: Jun. 13, 2023

(54) USER TERMINAL, RADIO BASE STATION AND RADIO COMMUNICATION METHOD

(71) Applicant: NTT DOCOMO, INC., Tokyo (JP)

(72) Inventors: Yoshihisa Kishiyama, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/080,573

(22) PCT Filed: Feb. 27, 2017

(86) PCT No.: PCT/JP2017/007499
§ 371 (c)(1),
(2) Date: Aug. 28, 2018

(87) PCT Pub. No.: WO2017/150447
PCT Pub. Date: Sep. 8, 2017

(65) Prior Publication Data
US 2019/0074944 A1 Mar. 7, 2019

(30) Foreign Application Priority Data
Feb. 29, 2016 (JP) .............................. JP2016-037957

(51) Int. Cl.
*H04L 5/00* (2006.01)
*H04W 72/20* (2023.01)
(Continued)

(52) U.S. Cl.
CPC .......... *H04L 5/0048* (2013.01); *H04L 5/0055* (2013.01); *H04L 27/2607* (2013.01);
(Continued)

(58) Field of Classification Search
CPC ........ H04J 1/00; H04L 5/0007; H04L 5/0048; H04L 5/0053; H04L 5/0055;
(Continued)

(56) References Cited

U.S. PATENT DOCUMENTS 8,249,043 B2 8/2012 Chauviere et al.
8,675,570 B2 * 3/2014 Cai .................. H04L 27/26035
375/259

(Continued)

FOREIGN PATENT DOCUMENTS

CN 103209061 A 7/2013
CN 103563436 A 2/2014
(Continued)

OTHER PUBLICATIONS

Extended European Search Report issued in counterpart European Patent Application No. 17759913.1, dated Jul. 25, 2019 (10 pages).
(Continued)

*Primary Examiner* — Christopher T Wyllie
(74) *Attorney, Agent, or Firm* — Osha Bergman Watanabe & Burton LLP

(57) ABSTRACT

The present invention is designed to communicate using a radio interface with improved scalability in the frequency domain. According to the present invention, a user terminal includes a receiving section that receives a downlink control signal including information about the assignment of a downlink data signal and receives the downlink data signal based on the downlink control signal, and a transmission section that transmits an uplink control signal including transmission acknowledgment information in response to the downlink data signal. Further, a plurality of frequency domain units constituting the entire frequency band as a block are formed. The downlink control signal, the downlink data signal and the uplink control signal are time-division-multiplexed in the same frequency domain unit.

9 Claims, 16 Drawing Sheets

(51) Int. Cl.
*H04W 72/23* (2023.01)
*H04L 27/26* (2006.01)
*H04W 72/0453* (2023.01)
*H04W 80/02* (2009.01)

(52) U.S. Cl.
CPC ....... *H04W 72/0453* (2013.01); *H04W 72/20* (2023.01); *H04W 72/23* (2023.01); *H04W 80/02* (2013.01)

(58) Field of Classification Search
CPC ... H04L 5/0057; H04L 5/0082; H04L 5/0091; H04L 27/2607; H04W 16/02; H04W 72/044; H04W 72/0406; H04W 72/0413; H04W 72/0453; H04W 72/1226; H04W 72/1268; H04W 72/1289; H04W 84/045; H04W 88/02; H04W 88/08
See application file for complete search history.

(56) References Cited

U.S. PATENT DOCUMENTS

| | | | |
|---|---|---|---|
| 9,425,942 | B2 | 8/2016 | Oizumi et al. |
| 10,135,598 | B2* | 11/2018 | Chen .................. H04L 1/0027 |
| 2007/0009054 | A1 | 1/2007 | Kwak et al. |
| 2008/0298477 | A1* | 12/2008 | Glasson ............... H04L 5/0053 455/509 |
| 2009/0168730 | A1* | 7/2009 | Baum .................. H04L 5/0037 370/336 |
| 2011/0051711 | A1 | 3/2011 | Kishiyama et al. |
| 2011/0085457 | A1* | 4/2011 | Chen .................. H04L 5/0053 370/252 |
| 2011/0261759 | A1 | 10/2011 | Yamada et al. |
| 2012/0008584 | A1 | 1/2012 | Higuchi et al. |
| 2012/0243499 | A1* | 9/2012 | Moon .................. H04L 5/0053 370/329 |
| 2014/0185530 | A1* | 7/2014 | Kuchibhotla ..... H04W 72/0446 370/329 |
| 2014/0187283 | A1* | 7/2014 | Nimbalker ............ H04W 72/51 455/550.1 |
| 2014/0219202 | A1* | 8/2014 | Kim ..................... H04L 5/0055 370/329 |
| 2015/0256308 | A1* | 9/2015 | Ma ....................... H04L 5/0035 370/330 |
| 2015/0282178 | A1 | 10/2015 | Kim et al. |
| 2015/0373694 | A1* | 12/2015 | You ..................... H04L 5/0051 370/329 |
| 2016/0057741 | A1 | 2/2016 | Seo et al. |
| 2016/0270070 | A1 | 9/2016 | Mukkavilli et al. |
| 2016/0286577 | A1 | 9/2016 | Aiba et al. |
| 2017/0207900 | A1 | 7/2017 | Kim et al. |
| 2019/0013904 | A1* | 1/2019 | Ma ....................... H04W 72/23 |
| 2020/0412510 | A1 | 12/2020 | Oizumi et al. |

FOREIGN PATENT DOCUMENTS

| | | |
|---|---|---|
| CN | 103718484 A | 4/2014 |
| CN | 105122677 A | 12/2015 |
| EP | 3360277 A1 | 8/2018 |
| JP | 2007-221753 A | 8/2007 |
| JP | 2007-336018 A | 12/2007 |
| JP | 2008-228279 A | 9/2008 |
| JP | 2008-546303 A | 12/2008 |
| JP | 2016-500964 A | 1/2016 |
| WO | 2009/119834 A1 | 10/2009 |
| WO | 2010/027035 A1 | 3/2010 |
| WO | 2013/021569 A1 | 2/2013 |
| WO | 2015131827 A1 | 9/2015 |
| WO | 2017/062062 A1 | 4/2017 |

OTHER PUBLICATIONS

Smee, J.E.; "5G Design Across Services"; Qualcomm Technologies, Inc., May 2015, Retrieved from the Internet:URL: https://johannesbergsummit.com/wp-content/uploads/sites/6/2014/11/Tuesday_3_John-Smee.pdf (23 pages).
Huawei Technologies; "Vision on 5G Radio Access Technologies"; 3GPP RAN workshop on 5G, RWS-150006; Phoenix, USA; Sep. 17-18, 2015 (18 pages).
3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
International Search Report issued in PCT/JP2017/007499 dated May 9, 2017 (2 pages).
Written Opinion issued in PCT/JP2017/007499 dated May 9, 2017 (7 pages).
Office Action issued in European Application No. 17759913.1; dated Jan. 12, 2021 (6 pages).
Notice of Reasons for Refusal issued in Japanese Application No. 2018-503292, dated Mar. 23, 2021 (9 pages).
Office Action issued in Japanese Application No. 2018-503292; dated Sep. 7, 2021 (11 pages).
Office Action issued in European Application No. 17759913.1, dated Sep. 19, 2022 (8 pages).
3GPP TS 36.331 V13.0.0; "3rd Generation Partnership Project; Technical Specification Group Radio Access Network; Evolved Universal Terrestrial Radio Access (E-UTRA); Radio Resource Control (RRC); Protocol specification (Release 13)"; Dec. 2015 (507 pages).
Office Action issued in Japanese Application No. 2018-503292; dated Mar. 8, 2022 (13 pages).
Office Action issued in Chinese Application No. 201780014015.5 dated Oct. 18, 2022 (23 pages).

* cited by examiner

| PHY CHANNELS/SIGNALS | ANCHOR CARRIER (M) | ANCHOR CARRIER (S) | BOOSTER CARRIER |
|---|---|---|---|
| SYNCHRONIZATION SIGNAL | YES (STATIC) | YES (SEMI-STATIC)? | NO |
| BROADCAST CHANNEL | YES | NO | NO |
| DISCOVERY/MOBILITY RS | YES | YES | YES |
| TANDOM ACCESS CHANNEL | YES | YES | YES |
| DL/UL DATA CHANNEL | YES | YES | YES |
| DL L1/L2 SIGNAL | YES | YES | YES |
| UL L1/L2 CONTROL SIGNAL | YES | YES | YES |
| CSI-RS | YES | YES | YES |
| SRS | YES | YES | YES |

FIG. 10

USER TERMINAL, RADIO BASE STATION AND RADIO COMMUNICATION METHOD

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "5G (5th generation mobile communication system)," "5G+ (5th generation mobile communication system plus)," "New RAT (Radio Access Technology)," and so on).

Existing LTE systems use control based on TDD (Time Division Duplex) and FDD (Frequency Division Duplex). For example, in TDD, whether to use each subframe in the uplink (UL) or in the downlink (DL) is strictly determined based on the UL/DL configuration.

In above LTE Rel. 8 to 12, the transmission time intervals (TTIs) that are applied to DL transmission and UL transmission between radio base stations and user terminals are configured to one ms and controlled. The TTIs in existing systems are also referred to as "subframes," "subframe durations," and so on, and serve as the unit of scheduling.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In future radio communication systems (for example, 5G, 5G+, etc.) of LTE Rel. 13 and/or later versions, in order to provide a highly scalable TTI configuration in the future, research has been conducted to make the duration of TTI shorter than one ms in existing LTE systems and to increase the transmission timing of transmission acknowledgment information (also referred to as "ACK/NACK (A/N: Acknowledgment/Negative-Acknowledgment)," "HARQ-ACK") used for HARQ (Hybrid Automatic repeat-reQuest) based retransmission control. For example, the TTI configuration that transmits an ACK/NACK that responds to the received signal in the same TTI as the TTI where the signal was received is also referred to as "self-contained."

Thus, in the future radio communication system, a study is in progress to frequency-division-multiplex a plurality of TTIs of different radio parameters (for example, TTI duration, cyclic prefix (CP) duration, timing to transmit ACK/NACK, signal format, etc.), in order to support various services with different requirements, such as eMBB (Enhanced Mobile Broad Band), IoT (Internet of Things) and so on.

However, in future radio communication systems that are supposed to frequency-division-multiplex a plurality of TTIs with different radio parameters, if communication control in existing LTE systems is applied as it is, there is a possibility that communication cannot be appropriately performed. Therefore, in future radio communication systems, radio interfaces that improve scalability not only in the time domain but also in the frequency domain are desired.

The present invention has been made in view of the above, and it is an object of the present invention to provide a user terminal capable of communicating using a radio interface with improved scalability in the frequency domain, a radio base station and a radio communication method.

Solution to Problem

A user terminal according to one aspect of the present invention includes a receiving section that receives a downlink control signal including information about the assignment of a downlink data signal and receives the downlink data signal based on the downlink control signal, and a transmission section that transmits an uplink control signal including transmission acknowledgment information in response to the downlink data signal, wherein a plurality of frequency domain units constituting the entire frequency band as a block are formed, and the downlink control signal, the downlink data signal, and the uplink control signal are time-division-multiplexed in the same frequency domain unit.

Advantageous Effects of Invention

According to the present invention, it is possible to communicate using a radio interface with improved scalability in the frequency domain.

BRIEF DESCRIPTION OF DRAWINGS

FIG. 10 is a diagram to show an example of a physical channel/signal supported by an anchor/booster carrier according to the present embodiment;

DESCRIPTION OF EMBODIMENTS

In future radio communication systems (for example, 5 G, 5 G+, etc.), research is underway to shorten the duration of TTI to less than one ms in existing LTE systems in order to realize low delay. Thus, the TTI whose time duration is shorter than one ms is also referred to as "shortened TTI," "short TTI," "partial TTI" and so on. Meanwhile, a TTI with a time duration of one ms is also referred to as "normal TTI," "long TTI," "subframe" and so on. Hereinafter, in order to distinguish between TTI of one ms and TTI shorter than one ms, they are referred to as "normal TTI" and "shortened TTI," respectively.

Examples of the shortened TTI include a first configuration example composed of normal TTI and the same number of symbols (for example, the normal CP is fourteen symbols), and a second configuration example composed of fewer symbols than the normal TTI. In the first configuration example, the symbol duration of each symbol in the shortened TTI is shorter than the symbol duration of the normal TTI (for example, 66.7 µs), while the subcarrier spacing in the shortened TTI is larger than the subcarrier spacing (for example, 15 kHz) in the normal TTI. In the second configuration example, each symbol in the shortened TTI has the same symbol duration as the symbol duration in the normal TTI.

Also, in future radio communication systems, signal assignment (also referred to as "self-contained assignment") in which transmission and reception control (scheduling, retransmission control, etc.) is completed within the TTI has been studied. The TTI to which the signal assignment is applied is also referred to as "self-contained TTI," "self-contained subframe," "self-contained symbol set," and so on.

Figure 1A:
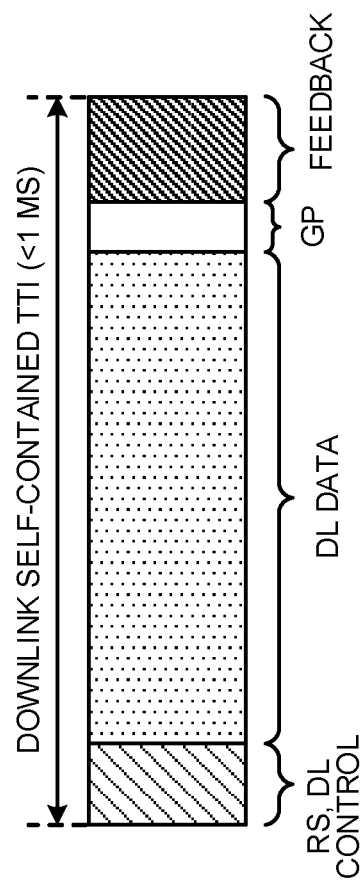
FIGS. 1A and 1B are diagrams to show examples of self-contained TTI.

FIG. 1 are diagrams to show an example of a self-contained TTI. As shown in FIG. 1A, a reference signal (RS)/downlink control (DL control) field to which a reference signal and/or downlink control signal are mapped, a downlink data (DL data) field to which a downlink data signal is mapped, and a feedback field to which transmission acknowledgment information in response to the relevant downlink data signal is mapped are provided in the downlink self-contained TTI. Between the data field and the feedback field, a guard period may be provided as a time for switching between the downlink and the uplink.

Figure 1B:
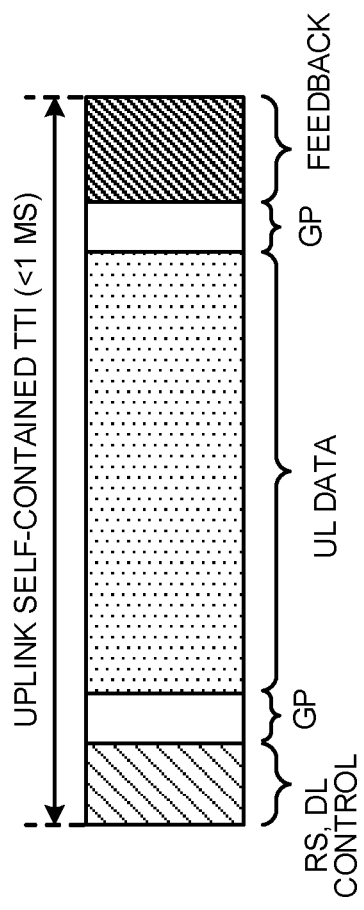

As shown in FIG. 1B, a reference signal/downlink control field to which a reference signal and/or downlink control signal are mapped, an uplink data field to which an uplink data signal is mapped, and a feedback field to which transmission acknowledgment information in response to the uplink data signal is mapped are provided in the uplink self-contained TTI. As a time to switch between the downlink and the uplink, a guard period may be provided between the reference signal/downlink control field and the data field, and between the data field and the feedback field.

In existing LTE systems, feedback information (for example, ACK/NACK) in response to downlink/uplink data is transmitted four TTI after the TTI in where the downlink/uplink data was received. Therefore, by using the self-contained TTI shown in FIGS. 1A and 1B, the delay time due to delayed feedback can be shortened. Also, in existing LTE systems, uplink data is transmitted four TTIs after the TTI where the downlink control signal was received. Therefore, by using the self-contained TTI shown in FIG. 1B, the delay time due to the delay of the assignment can be shortened.

Figure 2:
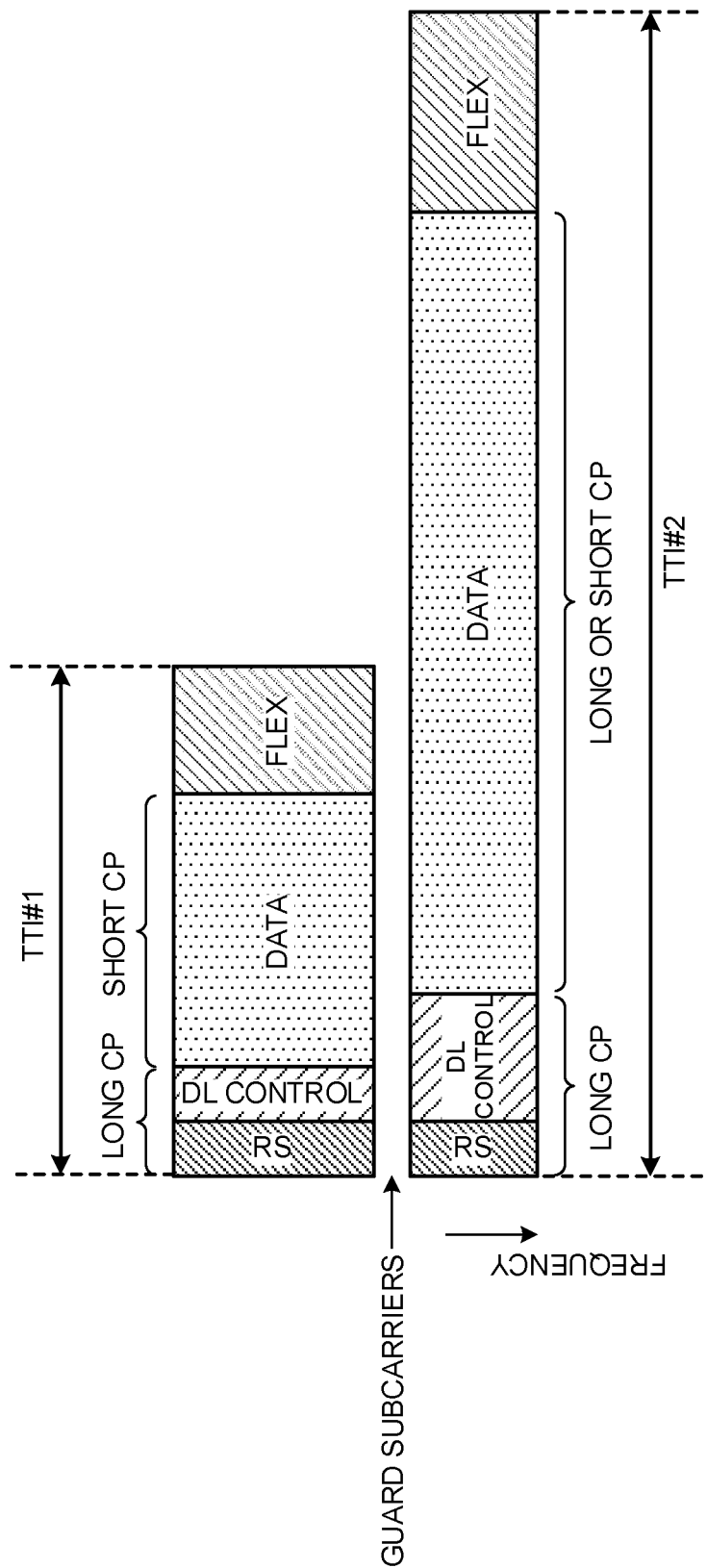
FIG. 2 is a diagram to show an example of frequency-division-multiplexing of multiple TTIs with different radio parameters.

In future radio communication systems, a study is in progress to frequency-division-multiplex a plurality of TTIs with different radio parameters. FIG. 2 is a diagram to show examples of multiple TTIs which are frequency-division-multiplexed. In FIG. 2, TTI #1 and TTI #2 with different time durations are frequency-division-multiplexed. Also, since a guard subcarrier is provided between TTI #1 and TTI #2, the impact such as frequency shift due to the Doppler effect is reduced.

As shown in FIG. 2, TTI #1 and TTI #2 can have different radio parameters besides time duration. For example, in TTI #1, a normal CP (short CP) is applied to the data signal, while in TTI #2, either the normal CP or the enhanced CP (long CP) is applied to the data signal. Also, the time duration (number of symbols) of the reference signal (RS)/downlink control (DL control) field and data field can be freely configured. Also, a versatile field (also referred to as "flex") used for versatile downlink/uplink signals may be provided.

Thus, in the future radio communication system assumed to frequency-division-multiplex a plurality of TTIs with different radio parameters, if communication control in existing LTE systems is applied as it is, there is a possibility that communication cannot be appropriately performed.

Therefore, in future radio communication systems, radio interfaces that improve not only scalability (for example, shortened TTI as described above, self-contained TTI etc.) in the time domain but also scalability in the frequency domain are required. Accordingly, the present inventors have studied radio interfaces with improved scalability in the frequency domain, and have arrived at the present invention. To be more specific, as one aspect of the present invention, the present inventors have come up with the idea of properly frequency-division-multiplexing a plurality of TTI with different radio parameters by applying a self-contained radio interface in the frequency domain.

(Radio Communication Method)

Now, the radio communication method according to one embodiment of the present invention will be described below. In the present embodiment, the TTI may be one ms as in existing LTE systems, may be shorter than one ms, or may be longer than one ms. In addition, the TTI may be a self-contained TTI (that is, self-contained transmission in the time domain) or a non-self-contained TTI.

In addition, each symbol duration in the TTI may be the same as the symbol duration in existing LTE systems, may be shorter than the symbol duration in existing LTE systems, or may be longer than the symbol duration in existing LTE systems. When the symbol duration in the TTI is 1/N of the symbol duration in existing LTE systems, the subcarrier spacing may be N times the subcarrier spacing in existing LTE systems. On the other hand, if the symbol duration in the TTI is N times the symbol duration in existing LTE systems, the subcarrier spacing may be 1/N of the subcarrier spacing in existing LTE systems. Further, the number of symbols in the TTI may be the same as or different from the number of symbols in existing LTE systems.

<Self-Contained Transmission in the Frequency Domain>

Figure 3:
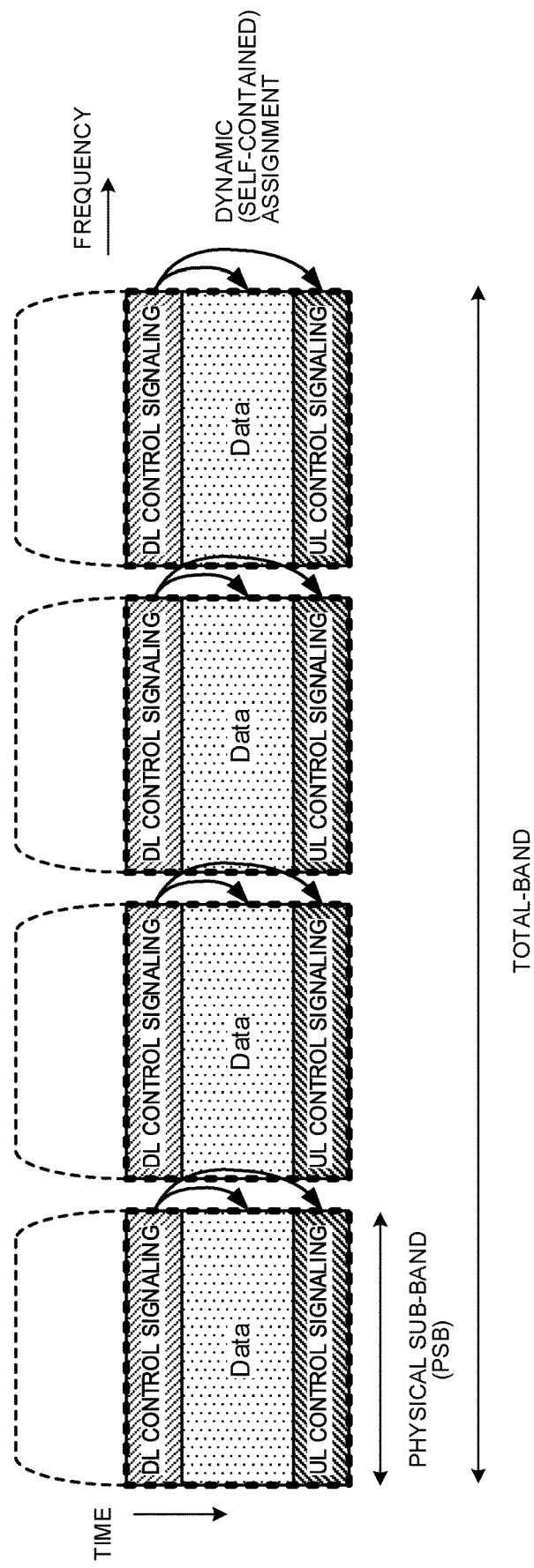
FIG. 3 is a diagram to show an example of self-contained transmission in the frequency domain according to the present embodiment.

FIG. 3 is a diagram to show an example of self-contained transmission in the frequency domain according to the present embodiment. As shown in FIG. 3, in the present embodiment, a plurality of physical subbands (PSB: Physical Sub Band) constituting the total band as a block are provided.

Here, the total band is the entire frequency band that the user terminal can use, such as a system band, a component carrier (CC), a carrier, and so on. Further, the PSB is a frequency block constituting the total band as a block, and is configured with one or more frequency units (for example, a resource block (PRB: Physical Resource Block), a subcarrier, etc.). The PSB may be referred to as "subband." In FIG. 3, four PSBs are provided in the total band, but the number of PSBs in the total band is not limited thereto.

Different radio parameters (for example, symbol duration, subcarrier spacing, TTI duration, CP duration, timing to transmit ACK/NACK, signal format, etc.) may be applied to each PSB in FIG. 3. This allows different radio access schemes such as 5G, 5G+ad so on to coexist in the same total band. Also, communication of multiple services (for example, eMBB, IoT, etc.) with different requirements can coexist in the total band.

Orthogonalization in the PSB by OFDM (Orthogonal Frequency Division Multiplexing) and interference cancellation between PSBs by filtering (OFDM with windowing or filtering) may be implemented in each PSB. Note that interference between PSBs may be prevented by providing guard subcarriers (guard band) between PSBs. Also, in each PSB, intra-PSB orthogonalization may be realized by SC-FDMA (Single Carrier Frequency Division Multiple Access).

As shown in FIG. 3, the present embodiment employs frequency domain self-contained transmissions where downlink and/or uplink (hereinafter referred to as "downlink/uplink") communications (for example, scheduling, data transmission, retransmission control, etc.) are completed within a single PSB.

To be more specific, in the case of the downlink, the user terminal receives a downlink control signal (DL control signal) including information about the assignment of the downlink data signal, and receives the downlink data signal (data) based on the assignment information. Further, the user terminal transmits a UL control signal including transmission acknowledgment information (hereinafter also referred to as "ACK/NACK") in response to the downlink data signal. As shown in FIG. 3, the downlink control signal, the downlink data signal, and the UL control signal are time-division-multiplexed (mapped to different time fields in the same PSB) in the same PSB.

Meanwhile, in the case of uplink, the user terminal receives the downlink control signal (DL control signal) including information about the assignment of the uplink data signal and transmits the uplink data signal (data) based on the assignment information. The user terminal receives a UL control signal including the ACK/NACK in response to the uplink data signal. As shown in FIG. 3, the downlink control signal, the uplink data signal, and the UL control signal are time-division-multiplexed (mapped to different time fields in the same PSB) in the same PSB.

In FIG. 3, TTIs with different radio parameters (for example, symbol duration, subcarrier spacing, TTI duration, CP duration, timing to transmit ACK/NACK, signal format, etc.) are placed in different PSBs, and communication completed per PSB is applied. Therefore, even when a plurality of TTIs with different radio parameters are frequency-division-multiplexed, communication can be appropriately performed, and the scalability in the frequency domain can be improved.

In FIG. 3, in the case of downlink, the downlink control signal, the downlink data signal and the UL control signal which are included in the same PSB may be included in the same TTI (that is, a self-contained TTI may be used). Similarly, in the case of uplink, the downlink control signal, the uplink data signal and the UL control signal which are included in the same PSB may be included in the same TTI (that is a self-contained TTI may be used). In this case, self-contained transmission is realized in both the frequency domain and the time domain, so that scalability can be improved in both the frequency domain and the time domain.

<Multi User/Layer Transmission within PSB>

Figure 4:
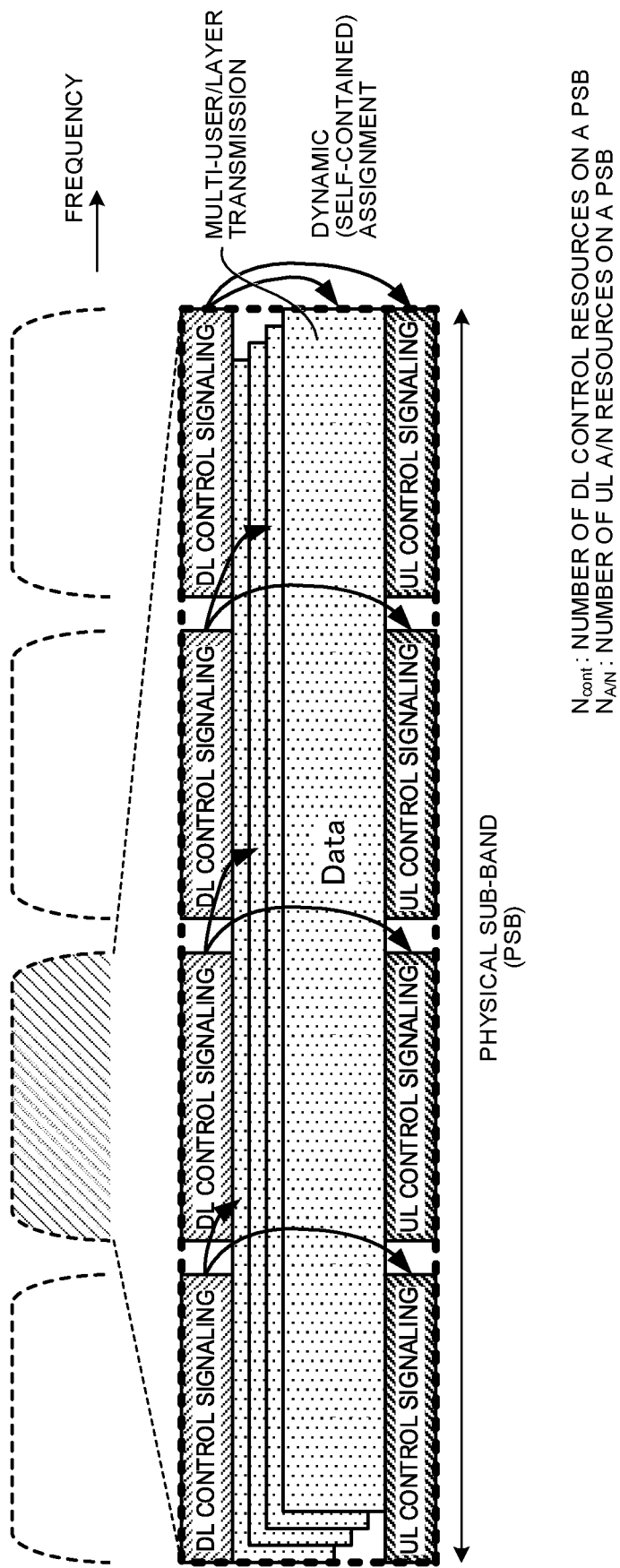
FIG. 4 is a diagram to show an example of multi-user/layer transmission within the PSB according to the present embodiment.

FIG. 4 is a diagram to show an example of multiuser/layer transmission within the PSB according to the present embodiment. FIG. 4 shows one PSB out of the four PSBs shown in FIG. 3 as an example. As shown in FIG. 3, in each PSB, transmission of a plurality of user terminals or transmission of a plurality of layers may be performed. Note that FIG. 4 can be applied to both the uplink and the downlink.

Frequency scheduling within the PSB does not have to be performed in the self-contained transmission in the frequency domain according to the present embodiment. As shown in FIG. 4, the plurality of data signals are multiplexed to the same frequency resource (for example, in FIG. 4, the entire PSB) in the same PSB. As a method of multiplexing a plurality of data signals, for example, MU-MIMO (Multi-User Multi-Input Multi-Output), CoMP (Coordinated Multi-Point), NAICS (Network-Assisted Interference Cancellation and Suppression)/NOMA (Non-Orthogonal Multiple Access), beam forming (BF) can be considered.

In MU-MIMO, multiple user terminals are multiplexed to the same time/frequency resource using space multiplexing and precoding. Also, in NAICS/NOMA, multiple user terminals are applied with different transmission powers and are multiplexed in the same time/frequency resources on the premise of interference cancellation at the receiving side. Also, when beamforming is adopted, multiple user terminals are multiplexed on the same time/frequency resources by precoding. In CoMP, multiple radio base stations perform coordinated transmission.

As shown in FIG. 4, by transmitting and receiving data signals using the entire PSB without performing frequency scheduling within the PSB, for example, the accuracy of channel estimation can be improved in the same manner as in PRB bundling in the LTE system. Also, scheduling can be simplified even when multiple data signals are multiplexed on the same PSB by MU-MIMO, CoMP, NAICS/NOMA, and beamforming.

Meanwhile, multiple downlink control signals including information about the assignment of the plurality of data signals may be frequency-division-multiplexed in the PSB. Even if the data signal fails to be received, the data signal is retransmitted by retransmission control. On the other hand, if the downlink control signal fails to be received, the downlink control signal is not retransmitted, and therefore it is desirable to improve the received quality. By transmitting multiple downlink control signals on different frequency resources, it is possible to improve the received quality of the plurality of downlink control signals as compared with a plurality of data signals multiplexed to the same frequency resource in the PSB.

Likewise, the uplink control signal including the ACK/NACK in response to the plurality of data signals may be frequency-division-multiplexed in the PSB. Here, "$N_{cont}$," which is the number of frequency resources (DL control resource) for the downlink control signal in the PSB, and "$N_{A/N}$," which is the number of frequency resources (UL A/N resource) for the uplink control signal in the PSB may be configured equal. In this case, the frequency resource for the downlink control signal and the frequency resource for the uplink control signal in the PSB may correspond on a one-to-one basis.

For example, in FIG. 4, $N_{cont}=N_{A/N}=4$ is configured. In FIG. 4, the user terminal may blind-decode the four frequency resources in the PSB and detect the downlink control signal for that user terminal. The user terminal receives the data signal mapped to the entire PSB based on the detected downlink control signal. The user terminal transmits an uplink control signal including the ACK/NACK in response to the data signal using a frequency resource corresponding to the frequency resource in which the downlink control signal is detected.

Alternatively, the user terminal may joint-encode the ACK/NACK in response to the plurality of data signals, and transmit the uplink control signal including the joint-encoded ACK/NACK using the entire PSB or using a specific frequency resource within the PSB.

<Bandwidth of PSB>

Figure 5A:
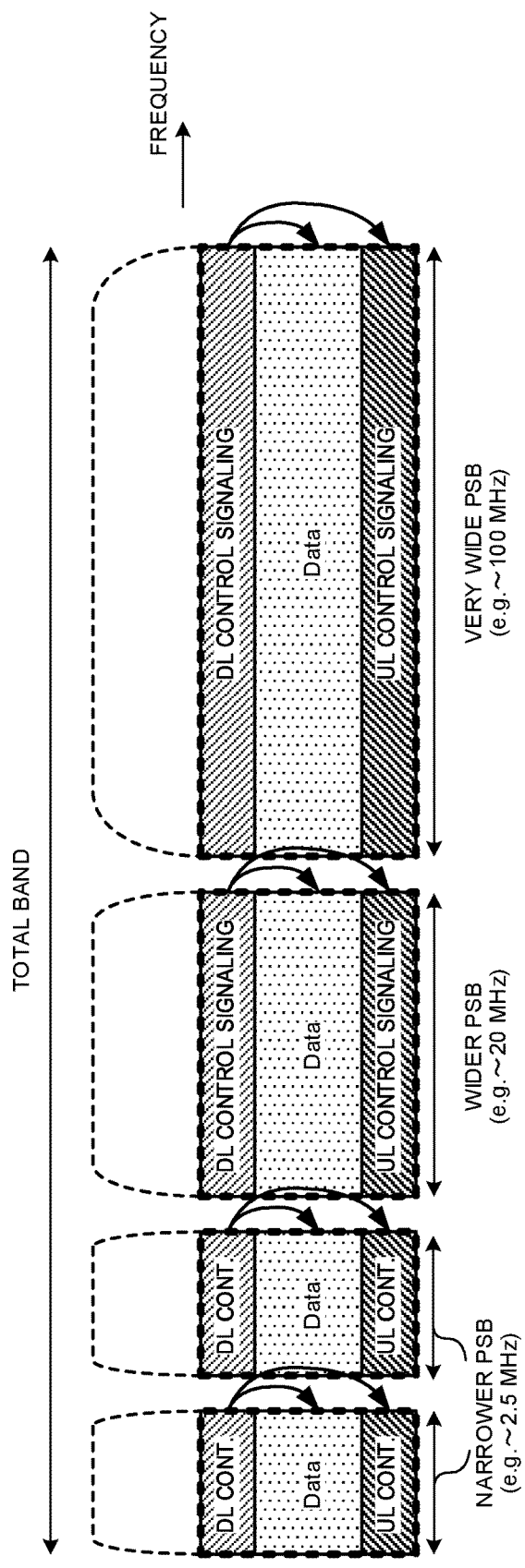
FIGS. 5A and 5B are diagrams each explaining the bandwidth of the PSB according to the present embodiment.

FIG. 5 is a diagram to explain the bandwidth of the PSB according to the present embodiment. In FIGS. 3 and 4, a plurality of PSBs with equal bandwidths are provided in the total band, but this is not limiting. As shown in FIG. 5A, a plurality of PSBs with different bandwidths may be provided in the total band. Note that FIG. 5A can be applied to both the uplink and the downlink.

For example, in FIG. 5A, two narrower PSBs, a wider PSB with a wider bandwidth than the narrower PSB, and a very wide PSB with a wider bandwidth than the wider PSB are provided in the total band.

The narrower PSB is, for example, a PSB having a bandwidth (narrow band) of 2.5 MHz at the maximum, and is suitable for transmitting and receiving data signals with a small packet size. Also, the wider PSB is, for example, a PSB having a bandwidth (wideband) of 20 MHz at maximum. Further, the very wide PSB is, for example, a PSB having a bandwidth (very wideband) of 100 MHz at the maximum, and is suitable for transmitting and receiving large volume data. By thus providing a plurality of PSBs with different bandwidths in the total band, it is possible to efficiently support transmission and reception of data signals of various packet sizes.

The bandwidth of each PSB is selected from the above multiple bandwidths (for example, narrow band, wideband, very wideband, etc.). Different resource mappings are applied to the downlink control signal according to the plurality of bandwidths, and the PRB assigned to the user terminal is detected by monitoring the search space by the user terminal.

Figure 5B:
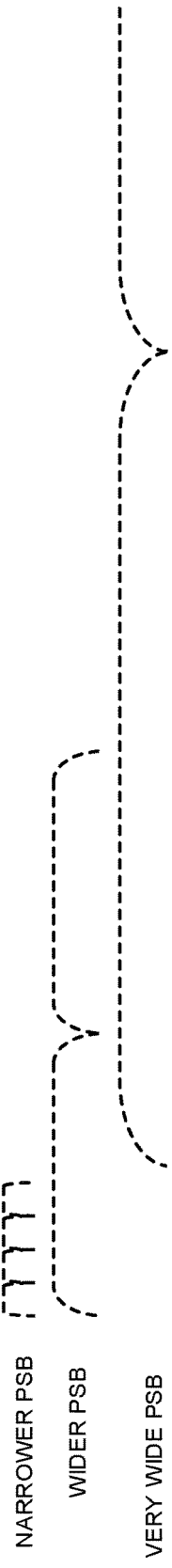

FIG. 5B is a diagram to show an example of detecting a PSB assigned to a user terminal. As shown in FIG. 5B, downlink control signals with different PSB bandwidths may be mapped in different formats. For example, FIG. 5B shows four search spaces (candidate field) for two narrower PSBs, two search spaces for a wider PSB, and two search space for a very wide PSB.

As shown in FIG. 5B, search spaces to which downlink control signals having different PSB bandwidths are mapped are configured with different frequency units. For example, referring to FIG. 5B, provided that one search space (candidate field) for the narrower PSB may be configured in one frequency unit, one search space for the wider PSB may be formed with eight frequency units, and one search space for the very wide PSB may be formed with twenty four frequency units. Frequency unit constituting each search space may be referred to as "control channel element (CCE)" and so on.

The user terminal monitors the search space for the full bandwidth PSB and detects the downlink control signal addressed to the user terminal. The user terminal detects the PSB for which the downlink control signal has been detected as PRB assigned to the user terminal. As described above, even when a plurality of PSBs with different bandwidths are provided in the total band, it is possible to detect in which bandwidth the user terminal communicates using the PSB of the bandwidth by applying blind decoding to the search spaces of the plurality of PSBs.

Alternatively, the PSB assigned to the user terminal may be reported using a downlink control signal which is different from the downlink control signal (hereinafter referred to as "PSB-indication signal") that includes information about the data signal assignment as described above. The PSB-indication signal includes information specifying the bandwidth of the PRB assigned to the user terminal. For example, the PSB-indication signal may be mapped to the first symbol in the TTI.

<Virtual PSB>

FIG. 6 are diagrams to show an example of localized/distributed mapping of the PSB according to the present embodiment. In FIG. 6, localized mapping and distributed mapping in the case where a plurality of PSBs with different bandwidths are provided as shown in FIG. 5 will be described. Note that the localized mapping described below can also be applied to a case where a plurality of PSBs with equal bandwidths are provided, as shown in FIGS. 3 and 4. Also, FIG. 6 can be applied to both the uplink and the downlink.

Figure 6A:
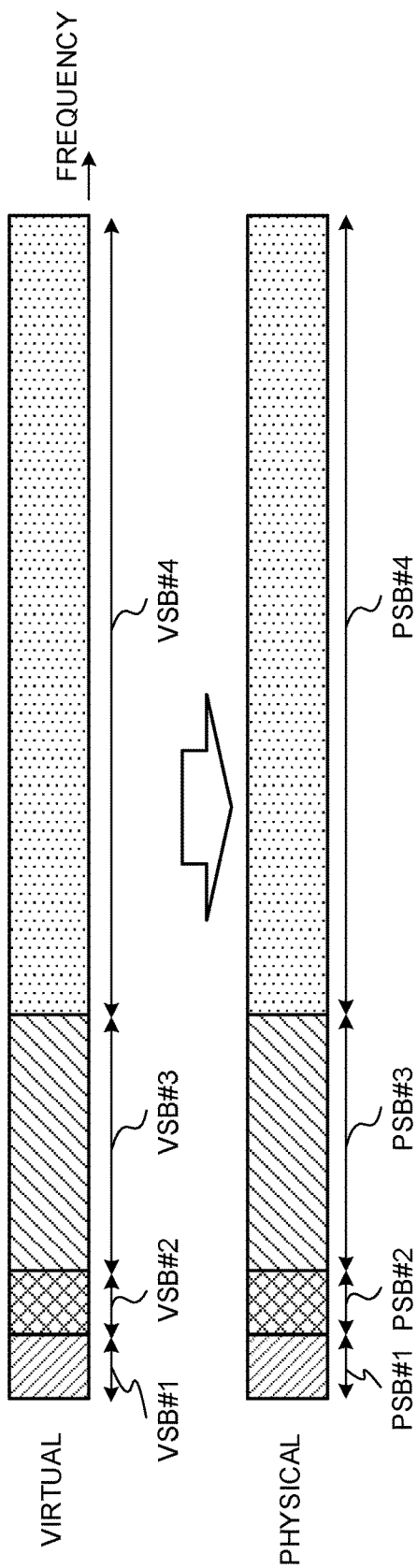
FIGS. 6A and 6B are diagrams to show an example of localized/distributed mapping of the PSB according to the present embodiment.

As shown in FIG. 6A, in localized mapping, virtual subbands (VSB) #1 to #4 are directly mapped to PSB #1 to PSB #4 in the total band. A VSB is a virtual resource field and a PSB is a physical resource field.

Figure 6B:
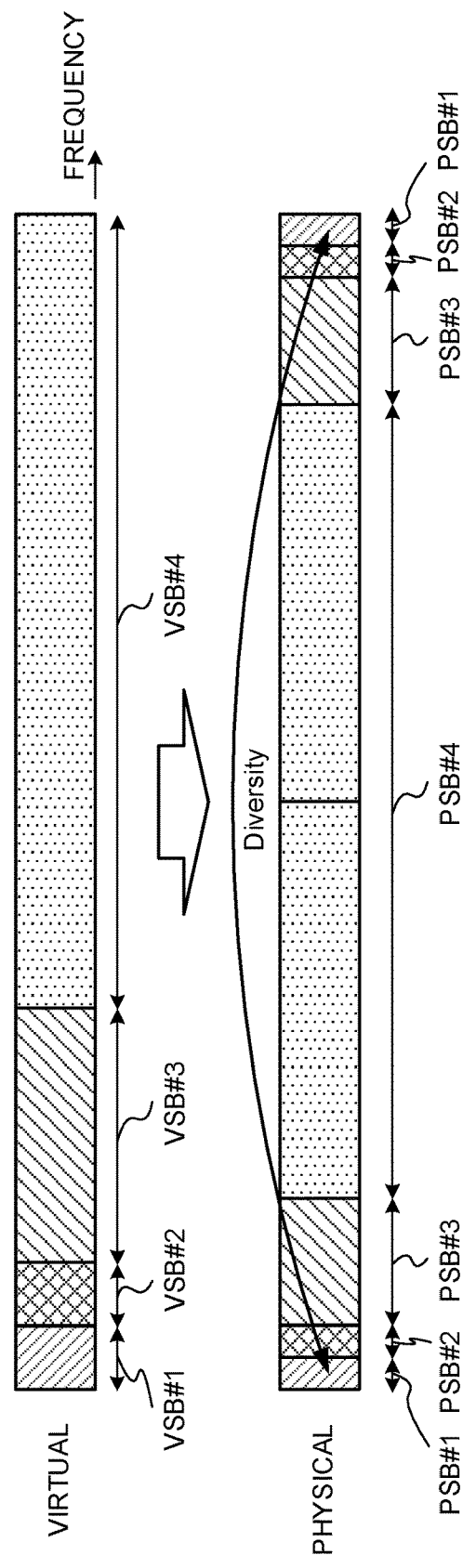

Meanwhile, as shown in FIG. 6B, in distributed mapping, VSB #1 to VSB #4 are each divided into two, and the divided VSBs are mapped to frequency positions that are symmetrical about the center frequency of the total band. With this, the same PSB is formed with two different frequency resources that are symmetrical about the center frequency. For this reason, distributed mapping can obtain the frequency diversity effect of the PSB.

Note that the localized mapping and the distributed mapping shown in FIG. 6 can also be applied to the downlink control signal and/or the uplink control signal which are frequency-division-multiplexed in the PSB. FIG. 7 is a diagram to show an example of localized/distributed mapping of the downlink control signal according to the present embodiment. In the case shown in FIG. 7, a plurality of downlink control signals #1 to #4 are frequency-division-multiplexed in the PSB, but uplink control signals are applicable as well.

Figure 7A:
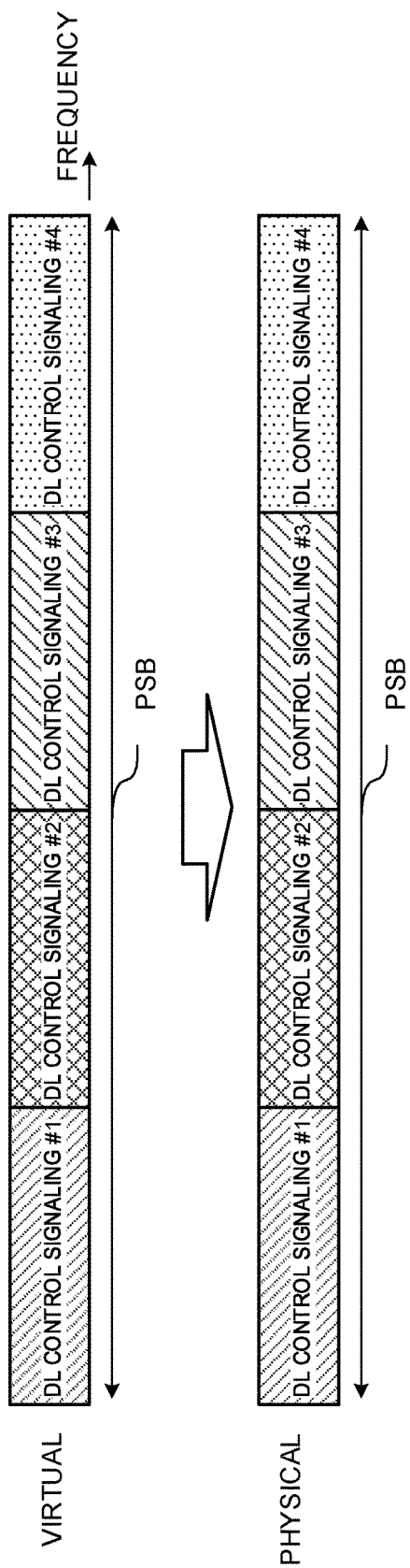
FIGS. 7A and 7B are diagrams to show an example of localized/distributed mapping of the downlink control signal according to the present embodiment.

As shown in FIG. 7A, in localized mapping, downlink control signals #1 to #4 which are frequency-division-multiplexed in the PSB are mapped to the virtual frequency resources (hereinafter abbreviated as "virtual resource") and then mapped directly to the physical frequency resources (hereinafter abbreviated as "physical resource") in the PSB.

Figure 7B:
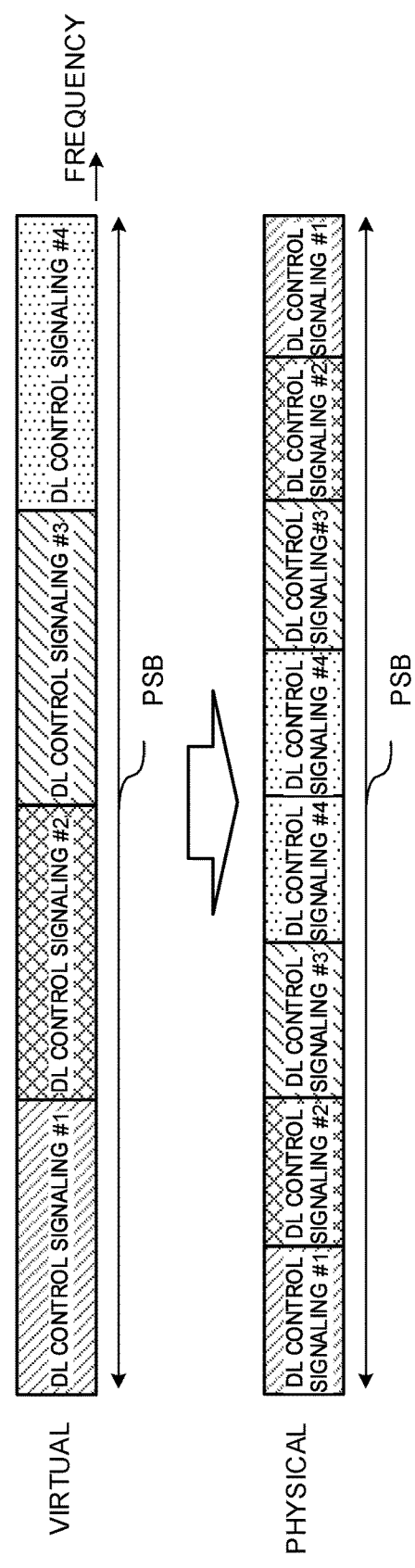

Meanwhile, as shown in FIG. 7B, in distributed mapping, downlink control signals #1 to #4 are mapped to the virtual resources, each downlink control signal is then divided into two virtual resources, and the divided virtual resources are mapped to frequency positions that are symmetrical about the center frequency of the total band. As a result, the physical resource to which the same downlink control signal is mapped is constituted by two different frequency resources that are symmetrical about the center frequency. Therefore, in distributed mapping, downlink control signals are interleaved, and frequency diversity effect can be obtained.

(Others)

FIG. 8 is a diagram to show an example of scheduling according to the present embodiment. Note that FIG. 8 shows an example in which PSBs #1 to #4 having the same bandwidth constitute a total band, but as described above, this is not limiting. Note that FIG. 8 can be applied to both the uplink and the downlink.

Figure 8A:
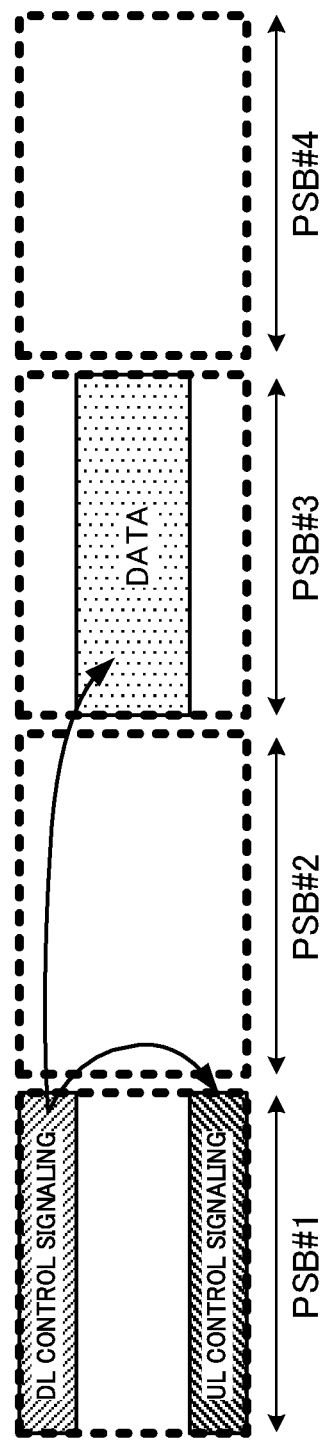
FIGS. 8A and 8B are diagrams to show examples of scheduling according to the present embodiment.

FIG. 8A shows an example of cross-PSB scheduling, in which data signals are assigned according to downlink control signals of different PSBs. For example, in FIG. 8A, the downlink control signal of PSB #1 includes information about the assignment of the data signal of PSB #3. The user terminal receives the data signal of PSB #3 based on the assignment information. Further, the user terminal transmits a UL control signal including the ACK/NACK in response to the data signal in PSB #1.

Figure 8B:
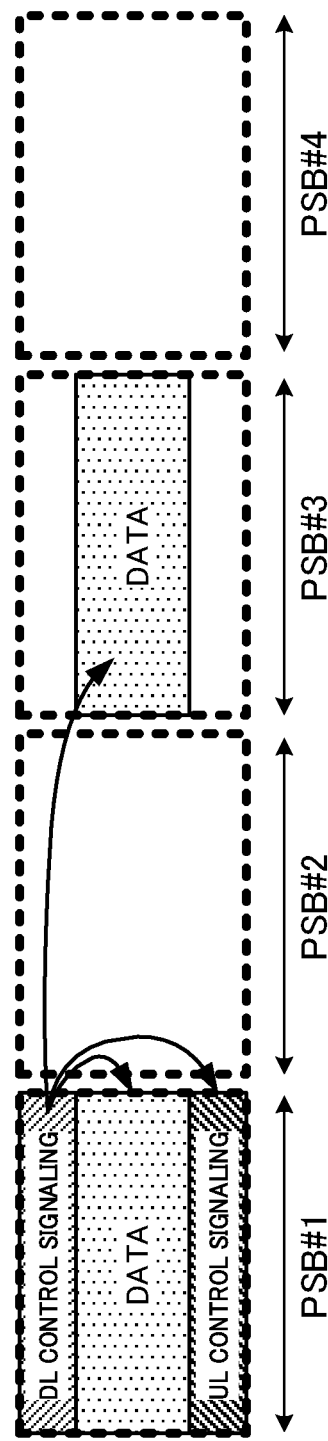

FIG. 8B shows an example of multi-PSB scheduling, in which data signals of a plurality of PSBs are assigned according to a downlink control signal of a single PSB. For example, in FIG. 8B, the downlink control signal of PSB #1 includes information about the assignment of the data signals of PSB #1 and #3. The user terminal receives the data signals of PSB #1 and #3 based on the assignment information. Further, the user terminal transmits a UL control signal including the ACK/NACK in response to the data signal in PSB #1.

In FIG. 8B, an ACK/NACK in response to the data signals of PSB #1 and #3 may be joint-encoded or may be separately encoded.

FIG. 9 is a diagram to show an example of anchor-carrier-assisted-access according to the present embodiment. An anchor carrier is a carrier that provides synchronization in the time domain and basic system information, and is equivalent to the PSB. A booster carrier is a carrier that communicates based on synchronization and system information provided by anchor carrier, and is equal to the PSB. The anchor carrier is also referred to as "primary carrier," "primary cell," "PCell," and the like. The booster carrier is also referred to as "secondary carrier," "secondary cell," "SCell," and the like.

Figure 9A:
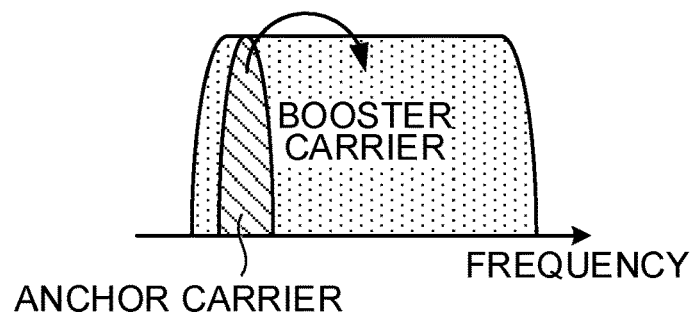
FIGS. 9A, 9B and 9C are diagrams to show examples of the radio frame structure according to the present embodiment.
Figure 9B:
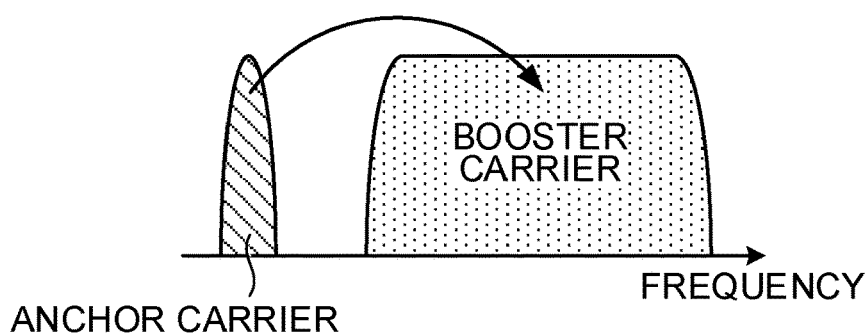
Figure 9C:
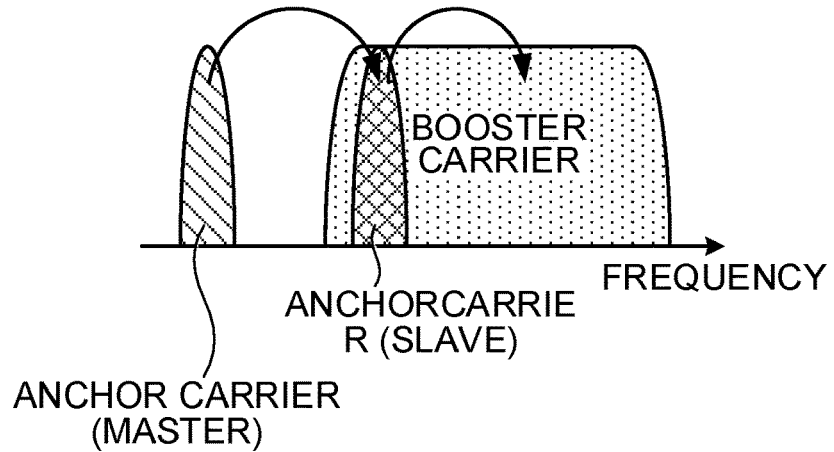

As an anchor-carrier-assisted-access scenario, an "in-band anchor," which is an anchor carrier provided in a booster carrier as shown in FIG. 9A, an "out-band anchor," which is an anchor carrier provided outside the booster carrier as shown in FIG. 9B, and a "dual anchor," providing a master anchor carrier and a slave anchor carrier as shown in FIG. 9C, are conceivable. Note that the scenarios shown in FIGS. 9A to 9C are merely examples, and these are not limiting.

For example, the anchor carrier may be an existing LTE system (for example, versions before Rel. 12) or a radio communication system (for example, Rel. 13, 14, etc.) that enhances an existing LTE system. The booster carrier may be a future radio communication system such as 5G, 5G+, and so on.

FIG. 10 is a diagram to show an example of a physical channel/signal supported by an anchor/booster carrier according to the present embodiment. As shown in FIG. 10, in the master anchor carrier, a synchronization signal, a broadcast channel, a discovery reference signal (or a mobility reference signal), a random access channel, a downlink/uplink data channel, a downlink L1/L2 control signal, an uplink L1/L2 control signal, a CSI-RS (Channel State Information-Reference Signal), and an SRS (Sounding Reference Signal) may be transmitted.

Meanwhile, in the slave anchor carrier, the synchronization signal may not be transmitted permanently like a master anchor carrier, but may be sent semi-statically. Broadcast channels do not have to be transmitted on slave/anchor carriers. Further, in the booster carrier, the synchronization signal and the broadcast channel need not be transmitted.

Note that the physical channels/signals supported in FIG. 10 are only examples, and the physical channels/signals supported by each carrier are not limited to these.

Further, the radio base station may transmit control information about the PSB to the user terminal. For example, PSB related control information may be transmitted using higher layer signaling (for example, RRC signaling, broadcast information (MIB, SIB) etc.), downlink control signals, or a combination thereof.

The PSB related control information may include, for example, a PRB assigned to the user terminal 20, information indicating a radio parameter (for example, symbol duration, subcarrier spacing, TTI duration, CP duration, signal format, etc.) used in the PSB, and the like.

(Radio Communication System)

Now, the structure of a radio communication system according to an embodiment of the present invention will be described below. In this radio communication system, the radio communication method is applied. Note that the radio communication methods of the above-described embodiment may be applied individually or may be applied in combination.

Figure 11:
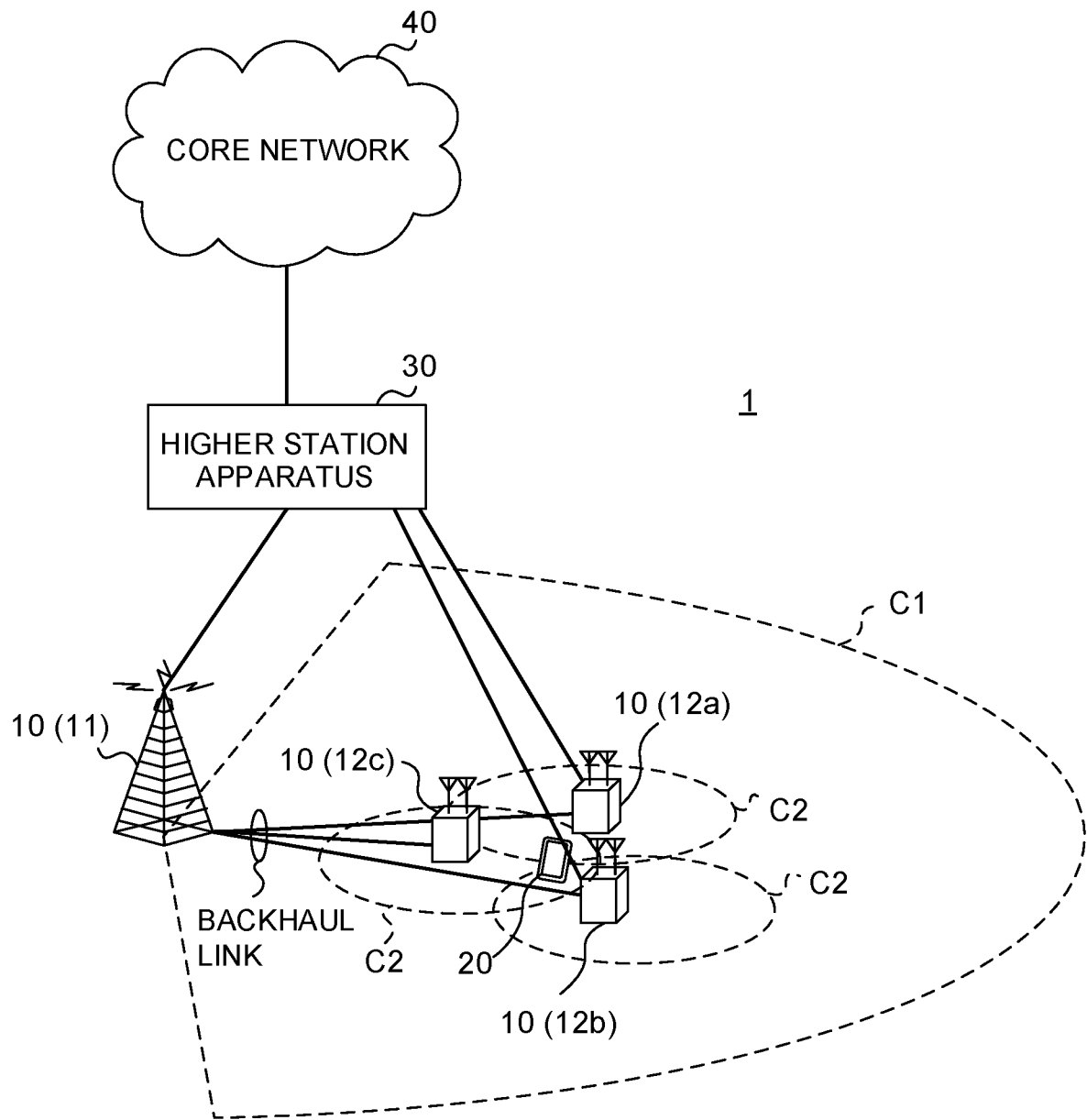
FIG. 11 is a diagram to show an example of a schematic structure of a radio communication system according to the present embodiment.

FIG. 11 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 shown in FIG. 11 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) transmission acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), transmission acknowledgment information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 12:
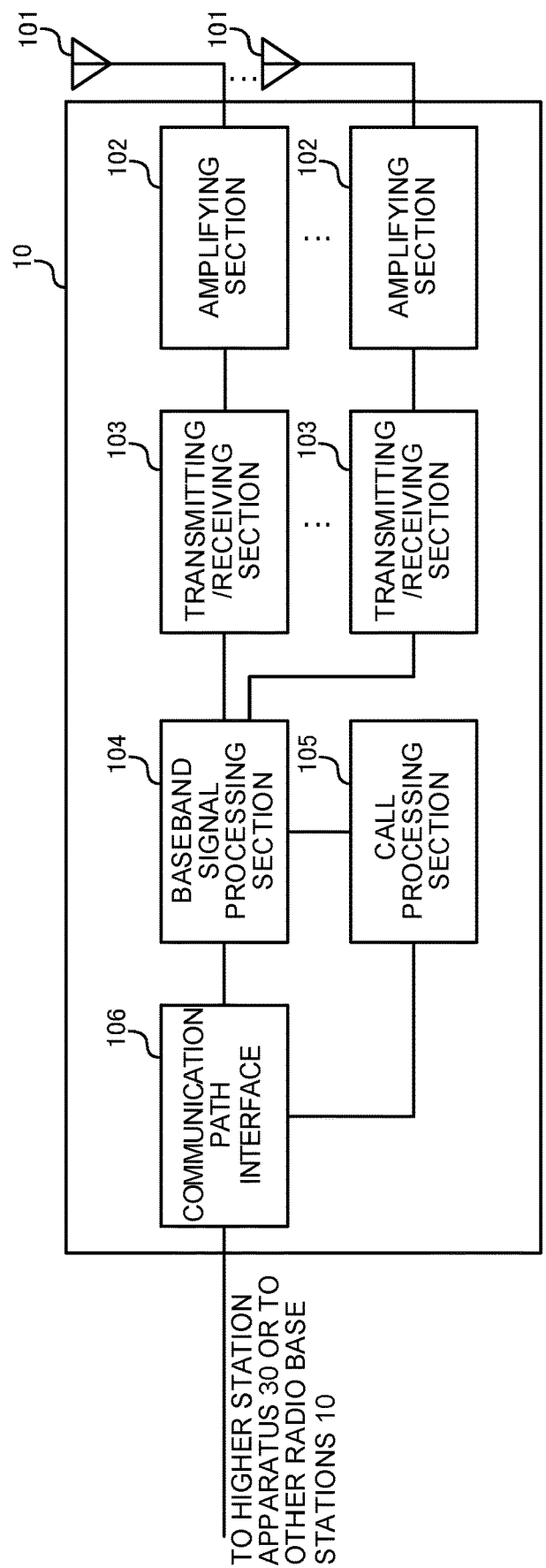
FIG. 12 is a diagram to show an example of an overall structure of a radio base station according to the present embodiment.

FIG. 12 is a diagram to show an example of an overall structure of a radio base station according to one differing embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit a downlink control signal including information about the assignment (scheduling information, DL assignment, etc.) of the downlink data signal. In addition, the transmitting/receiving sections 103 transmit a downlink data signal. In addition, the transmitting/receiving sections 103 receive an uplink control signal including an ACK/NACK in response to the downlink data signal.

In addition, the transmitting/receiving sections 103 transmit a downlink control signal including information about the assignment (scheduling information, UL grant, etc.) of the uplink data signal. In addition, the transmitting/receiving sections 103 receive the transmitted uplink data signal based on the assignment information. In addition, the transmitting/receiving sections 103 transmit an uplink control signal including an ACK/NACK in response to the uplink data signal.

In addition, the transmitting/receiving sections 103 transmit control information about the PSB. For example, the transmitting/receiving sections 103 may transmit control information about the PSB using higher layer signaling (for example, RRC signaling, broadcast information (MIB, SIB) etc.), downlink control signals, or a combination thereof.

Figure 13:
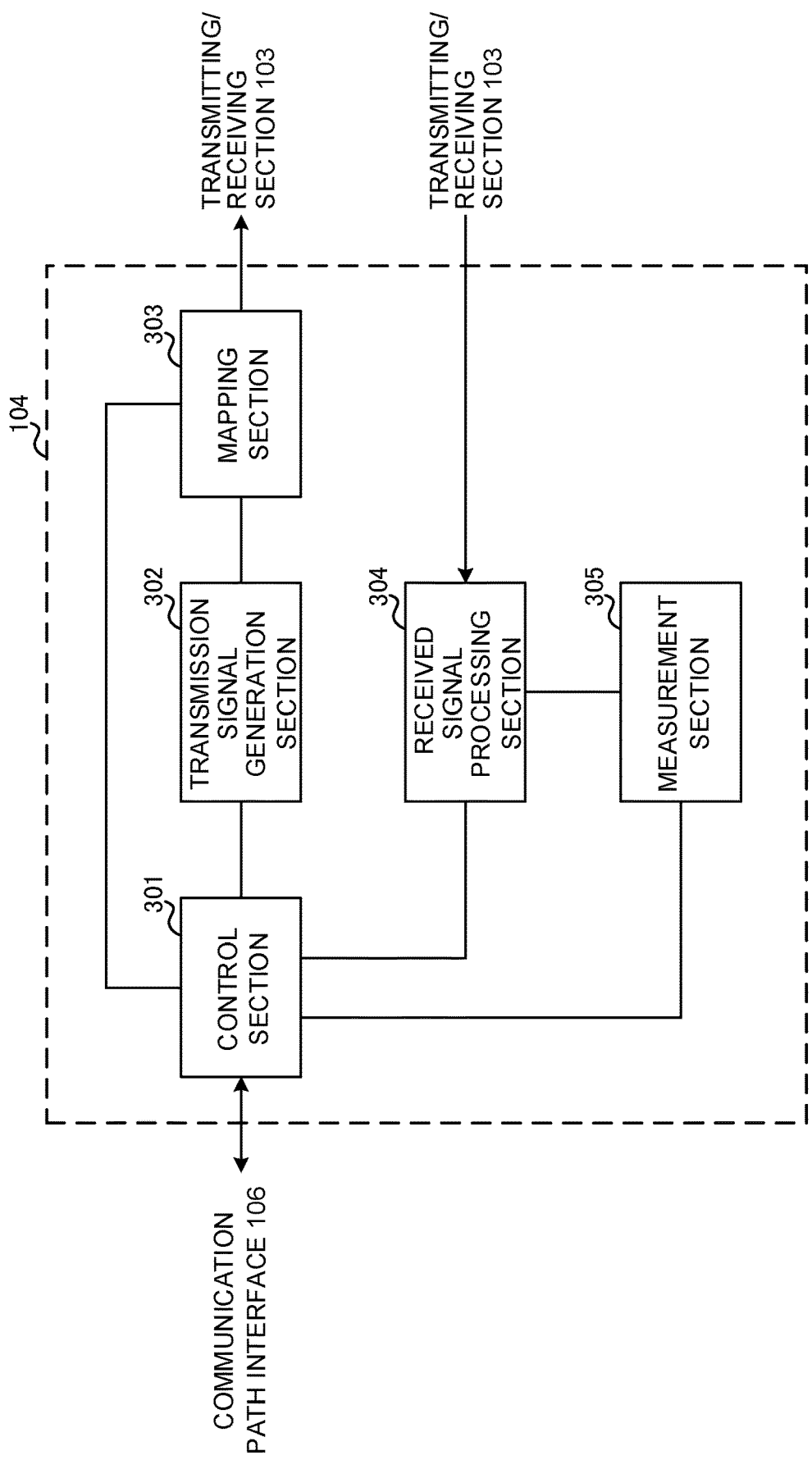
FIG. 13 is a diagram to show an example of a functional structure of a radio base station according to the present embodiment.

FIG. 13 is a diagram to show an example of a functional structure of a radio base station according to one embodiment of the present invention. Note that, although FIG. 13 primarily shows functional blocks that pertain to characteristic parts of the present embodiment, the radio base station 10 has other functional blocks that are necessary for radio communication as well. As shown in FIG. 13, the baseband signal processing section 104 has a control section (scheduler) 301, a transmission signal generation section 302, a mapping section 303, a received signal processing section 304 and a measurement section 305.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of the system information, the downlink data signal (for example, PDSCH), the downlink control signal (for example, PDCCH/EPDCCH), and the like. Further, the control section 301 controls the generation of the downlink data signal based on the ACK/NACK from the user terminal 20. Further, the control section 301 controls the generation of an uplink control signal including an ACK/NACK based on the determination result of the uplink data signal from the user terminal 20. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

In addition, the control section 301 controls the scheduling of the uplink data signal (for example, PUSCH), the uplink control signal (for example, PUCCH), the random access preamble transmitted in the PRACH, the uplink reference signal (for example, SRS), and the like.

Further, the control section 301 may form a plurality of PSBs (frequency domain unit) constituting the total band (overall frequency band) as a block. Further, the control section 301 may exert control so that communication is performed for each PSB with TTIs with different radio parameters.

Further, when a plurality of PSBs constituting a total band as a block are formed, the control section 301 may assign different time resources to the downlink control signal, the downlink data signal, and the uplink control signal in the same PSB. Thereby, the downlink control signal, the downlink data signal, and the uplink control signal are time-division-multiplexed in the same PSB (FIG. 3). Also, the control section 301 may assign different time resources to the downlink control signal, the downlink data signal, and the uplink control signal in the same TTI in the same PSB.

Further, when a plurality of PSBs constituting the total band as a block are formed, the control section 301 may assign different time resources to the downlink control signal, the uplink data signal and the uplink control signal in the same PSB. Thereby, the downlink control signal, the uplink data signal, and the uplink control signal are time-division-multiplexed in the same PSB (FIG. 3). Also, the control section 301 may assign different time resources to the downlink control signal, the uplink data signal, and the uplink control signal in the same TTI in the same PSB.

In addition, the control section 301 may frequency-division-multiplex a plurality of downlink control signals in the same PSB (different frequency resources may be assigned in the same PSB)(FIG. 4). Further, the control section 301 may multiplex a plurality of data signals to the same time/frequency resources in the same PSB by using, for example, MU-MIMO, CoMP, SAICS/NOMA, and beamforming. In the same PSB, "$N_{cont}$," which is the number of frequency resources for the downlink control signal, and "$N_{A/N}$," which is the number of frequency resources for the uplink control signal may be equal, on a 1:1 basis.

Also, the control section 301 may configure the PSB to have a selected bandwidth from multiple bandwidths (optional) (FIG. 5A). In this case, the control section 301 may apply different resource mappings to the downlink control signal, depending on the plurality of bandwidths (FIG. 5B). That is, the control section 301 may apply the resource mappings varying for each bandwidth to the downlink control signal.

Further, the control section 301 may perform localized mapping of a plurality of PSBs in the total band, or may perform distributed mapping (FIGS. 6A and 6B). In the case of distributed mapping, the control section 301 may control the mapping section 303 so as to virtually map downlink data signal and/or downlink control signal to the VSB, convert the VSB into the PSB according to a predetermined rule, and perform physical mapping.

Further, the control section 301 may perform localized mapping of downlink control signals or distributed mapping in the same PSB (FIGS. 7A and 7B). In the case of distributed mapping, the control section 301 may control the mapping section 303 so as to virtually map the downlink control signal to a virtual resource in the same resource, convert the virtual resource into a physical resource according to a predetermined rule, and perform physical mapping.

Also, the control section 301 may perform cross-PSB scheduling of downlink data signals and/or uplink data signals, or may perform multi-PSB scheduling (FIGS. 8A and 8B).

In addition, the control section 301 may configure one of the PSBs in the total band as an anchor carrier (FIG. 9). The control section 301 may exert control so that, in the PSB that is configured as an anchor carrier, at least one of a synchronization signal, a broadcast channel, a discovery reference signal (or mobility reference signal), a random access channel, a downlink/uplink data channel, a downlink L1/L2 control signal, an uplink L1/L2 control signal, an CSI-RS and an SRS is transmitted (FIG. 10).

In addition, the control section 301 may exert control so that control information about the PSB is generated and reported to the user terminal 20 using the higher layer signaling (for example, RRC signaling, broadcast information (MIB, SIB) etc.), the downlink control signal, or a combination thereof.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

The transmission signal generation section 302 generates a downlink control signal including information about the assignment of the downlink data signal and an uplink control signal including information about the assignment of the uplink data signal based on, for example, commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH including an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

(User Terminal)

Figure 14:
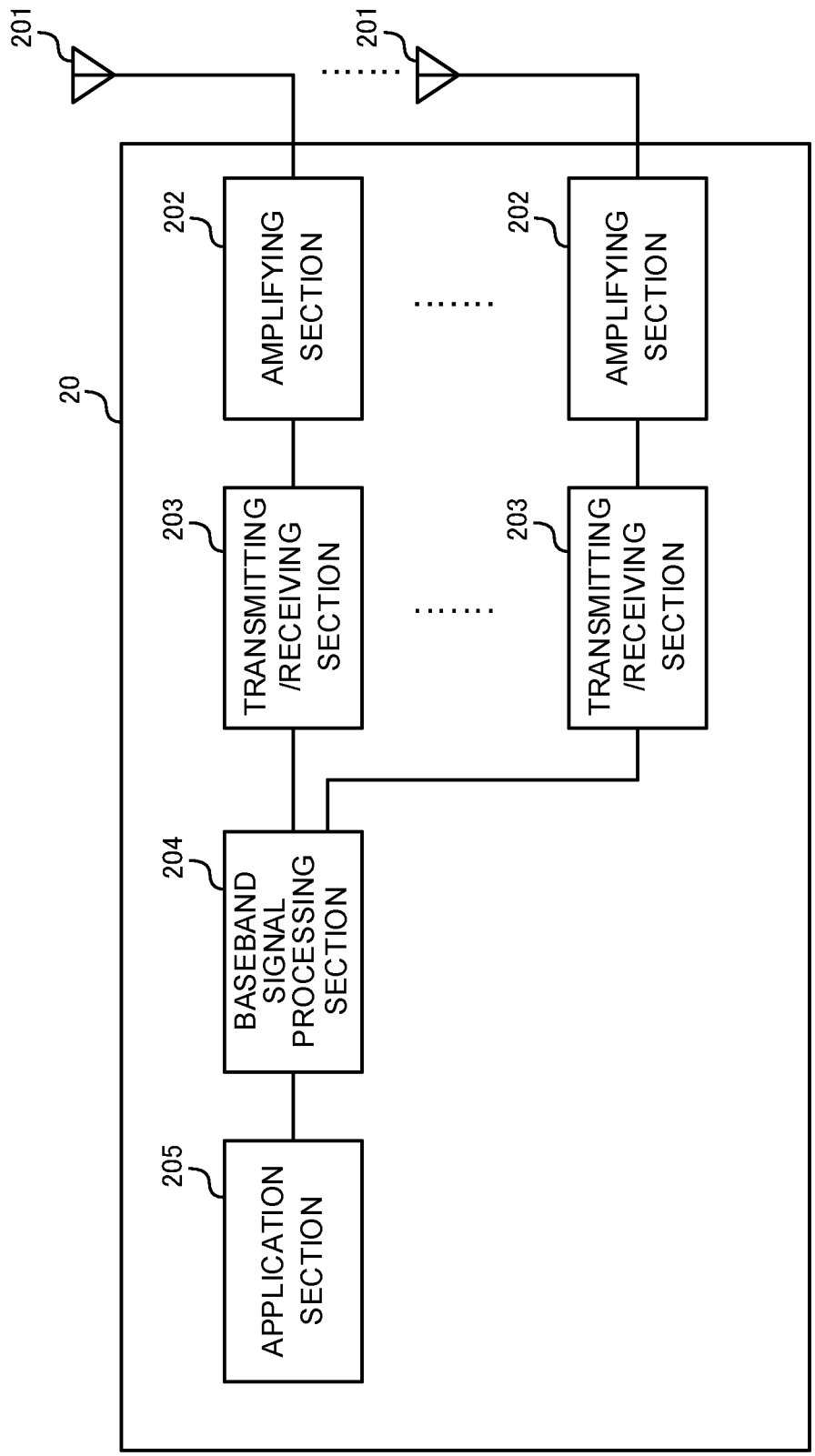
FIG. 14 is a diagram to show an example of an overall structure of a user terminal according to the present embodiment.

FIG. 14 is a diagram to show an example of an overall structure of a user terminal according to one differing embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive the downlink control signal including information about the assignment (scheduling information, DL assignment, etc.) of the downlink data signal. In addition, the transmitting/receiving sections 203 receive the downlink data signal based on the assignment information. In addition, the transmitting/receiving sections 203 transmit an uplink control signal including an ACK/NACK in response to the downlink data signal.

In addition, the transmitting/receiving sections 203 receive a downlink control signal including information about the assignment (scheduling information, UL grant, etc.) of the uplink data signal. Further, the transmitting/receiving sections 203 transmit an uplink data signal based on the assignment information. In addition, the transmitting/receiving sections 203 receive an uplink control signal including an ACK/NACK in response to the uplink data signal.

In addition, the transmitting/receiving sections 203 receive control information about the PSB. For example, the transmitting/receiving sections 203 may receive control information about the PSB using higher layer signaling (for example, RRC signaling, broadcast information (MIB, SIB) etc.), downlink control signals, or a combination thereof.

Figure 15:
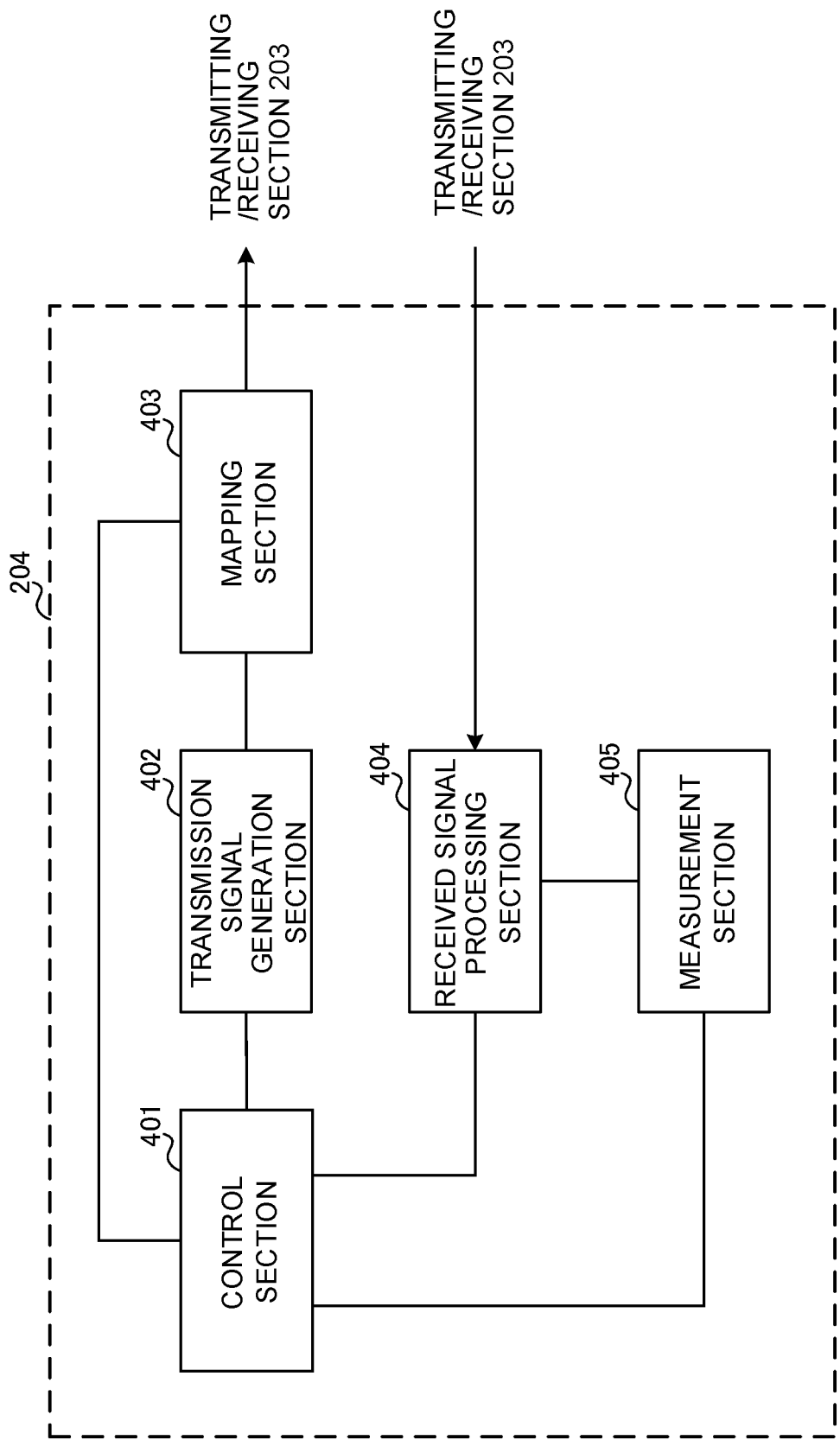
FIG. 15 is a diagram to show an example of a functional structure of a user terminal according to the present embodiment.

FIG. 15 is a diagram to show an example of a functional structure of a user terminal according to one differing embodiment of the present invention. Note that, although FIG. 15 primarily shows functional blocks that pertain to characteristic parts of the present embodiment, the user terminal 20 has other functional blocks that are necessary for radio communication as well. As shown in FIG. 15, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (PDCCH/EPDCCH/M-PDCCH) and downlink data signals (PDSCH), transmitted from the radio base station 10, from the received signal processing section 404. The control section 401 controls the generation of the uplink data signal based on the downlink control signal and/or the ACK/NACK from the radio base station 10. Further, the control section 401 controls the generation of an uplink control signal including an ACK/NACK based on the determination result of the downlink data signal.

Further, the control section 401 may configure at least one PSB to be used for communication of the user terminal 20 based on information about the PSB from the radio base station 10.

Further, when a plurality of PSBs constituting the total band as a block are formed, the control section 401 may exert control so that the reception of a downlink control signal including information about the assignment of the downlink data signal and the downlink data signal, and the transmission of an uplink control signal including ACK/NACK in response to the relevant downlink data signal are performed in different time resources in the same PSB (FIG. 3). Also, the control section 401 may exert control so that the reception of the downlink control signal and the downlink data signal and the transmission of the uplink control signal are performed in different time resources in the same TTI in the same PSB.

Also, when a plurality of PSBs constituting a total band as a block are formed, the control section 401 may exert control so that the reception of the downlink control signal including information about the assignment of the uplink data signal, the transmission of the uplink data signal, and the reception of the uplink control signal including the ACK/NACK in response to the uplink data signal are performed in different time resources in the same PSB (FIG. 3). Also, the control section 401 may exert control so that the reception of the downlink control signal and the uplink control signal and the transmission of the downlink data signal are performed in different time resources in the same TTI in the same PSB.

In addition, the control section 401 performs blind decoding of a plurality of downlink control signals which are frequency-division-multiplexed in the same PSB (assigned to different frequency resources) (FIG. 4). To be more specific, the control section 401 monitors the search space and detects the downlink control signal addressed to the user terminal 20. Also, based on the detected downlink control signal, the control section 401 may exert control so that the downlink data signal multiplexed in the PSB is demodulated by MU-MIMO, CoMP, SAICS/NOMA, beamforming or the like.

Also, the control section 401 may exert control so that the uplink control signal is transmitted using the frequency resource corresponding to the frequency resource for which the downlink control signal was detected.

Also, if the PSB is configured to a bandwidth selected from multiple bandwidths (option) (FIG. 5A), the control section 401 may detect the downlink control signal addressed to the user terminal 20 by applying blind decoding to the resource mapping format (search space) for all kinds of bandwidths (FIG. 5B).

Further, the control section 401 may perform localized mapping of a plurality of PSBs in the total band, or may perform distributed mapping (FIGS. 6A and 6B). In the case of distributed mapping, the control section 401 may control the mapping section 403 so as to virtually map the uplink data signal and/or the uplink control signal to the VSB, convert the VSB into the PSB according to a predetermined rule, and perform physical mapping.

Further, the control section 401 may perform localized mapping of the uplink control signal or distributed mapping in the same PSB (FIGS. 7A and 7B). In the case of distributed mapping, the control section 401 may control the mapping section 403 so as to virtually map the uplink control signal to a virtual resource in the same resource, convert the virtual resource into a physical resource according to a predetermined rule, and perform physical mapping.

In addition, the control section 401 may exert control so that the reception of the downlink data signal and/or the transmission of the uplink data signal are performed by cross-PSB scheduling or multi-PSB scheduling (FIGS. 8A and 8B).

Further, the control section 401 may configure one of a plurality of PSBs in the total band as an anchor carrier (FIG. 9). The control section 401 may exert control so that, in the PSB configured as an anchor carrier, at least one of a synchronization signal, a broadcast channel, a discovery reference signal (or mobility reference signal), a random access channel, a downlink/uplink data channel, a downlink L1/L2 control signal, a uplink L1/L2 control signal, a CSI-RS and a SRS is received (FIG. 10).

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to transmission acknowledgment information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing unit 404 performs blind decoding on the DCI (DCI format) for scheduling transmission and/or reception of data (TB: Transport Block) based on commands from the control section 401. For example, the received signal processing section 404 may be configured to blind-decode different radio resources based on whether or not the subframe is a self-contained subframe.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 16:
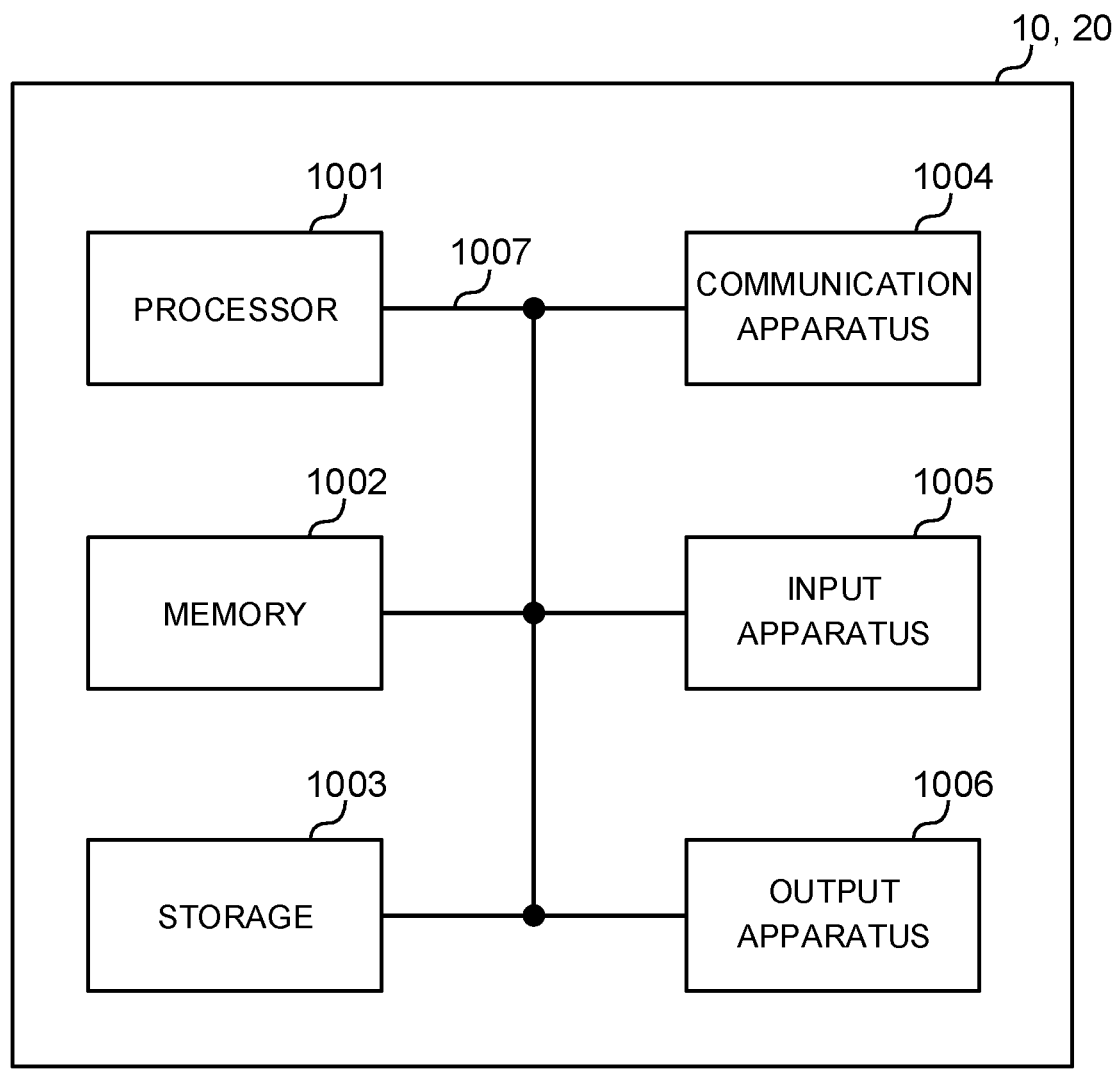
FIG. 16 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 16 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least 1 of a ROM (Read Only Memory), an EPROM (Erasable Programmable ROM), a RAM (Random Access Memory) and so on. The memory 1002 may be referred to as a "register," a "cache," a "main memory (primary storage apparatus)" and so on. The memory 1002 can store executable programs (program codes), software modules, and the like for implementing the wireless communication method according to one differing embodiment of the present invention.

The storage 1003 is a computer-readable recording medium, and is configured with at least 1 of an optical disk such as a CD-ROM (Compact Disc ROM), a hard disk drive, a flexible disk, a magneto-optical disk, a flash memory and so on. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." Furthermore, a "component carrier (CC)" may be referred to as a "cell," a "frequency carrier," a "carrier frequency" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, 1 subframe may be referred to as a "transmission time interval (TTI)," or a plurality of consecutive subframes may be referred to as a "TTI," and 1 slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this.

A TTI having a time duration of one ms may be referred to as a "normal TTI (TTI in LTE Rel. 8 to 12)," a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

The examples/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the examples/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-037957, filed on Feb. 29, 2016, including the specification, drawings and abstract, is incorporated herein by reference in its entirety.

The invention claimed is:
1. A terminal comprising:
   a receiver that receives radio resource control (RRC) signaling including information about a frequency block of a plurality of blocks on a carrier, the information about the frequency block being at least one of information about a downlink bandwidth part formed with continuous resource blocks and information about an uplink bandwidth part formed with continuous resource blocks; and a processor that configures, based on the information about the frequency block, a bandwidth of the frequency block, a subcarrier spacing of the frequency block that is different from a subcarrier spacing of another block among the plurality of blocks, and a cyclic prefix length.

2. The terminal according to claim 1,
wherein the processor controls at least one of downlink communication and uplink communication in the frequency block based on the bandwidth of the frequency block, the subcarrier spacing and the cyclic prefix length.

3. The terminal according to claim 2,
wherein the receiver receives downlink control information including assignment information of a downlink shared channel or an uplink shared channel in the frequency block.

4. The terminal according to claim 1,
wherein the receiver receives downlink control information including assignment information of a downlink shared channel or an uplink shared channel in the frequency block.

5. The terminal according to claim 4,
wherein the downlink control information indicates the frequency block assigned to one of the downlink shared channel and the uplink shared channel.

6. The terminal according to claim 1, wherein the plurality of blocks includes frequency blocks having different bandwidths, the frequency blocks including frequency blocks having a bandwidth of 2.5 MHz or less and frequency blocks having a bandwidth of greater than 2.5 MHz.

7. A radio communication method for a terminal, comprising:
receiving radio resource control (RRC) signaling including information about a frequency block of a plurality of blocks on a carrier, the information about the frequency block being at least one of information about a downlink bandwidth part formed with continuous resource blocks and information about an uplink bandwidth part formed with continuous resource blocks; and
configuring, based on the information about the frequency block, a bandwidth of the frequency block, a subcarrier spacing of the frequency block that is different from a subcarrier spacing of another block among the plurality of blocks, and a cyclic prefix length.

8. A base station comprising:
a transmitter that transmits radio resource control (RRC) signaling including information about a frequency block of a plurality of blocks on a carrier, for a terminal, the information about the frequency block being at least one of information about a downlink bandwidth part formed with continuous resource blocks and information about an uplink bandwidth part formed with continuous resource blocks; and
a processor that configures, based on the information about the frequency block, a bandwidth of the frequency block, a subcarrier spacing of the frequency block that is different from a subcarrier spacing of another block among the plurality of blocks, and a cyclic prefix length, for the terminal.

9. A system comprising a base station and a terminal, wherein:
the base station comprises:
a transmitter that transmits radio resource control (RRC) signaling including information about a frequency block of a plurality of blocks on a carrier, for a terminal, the information about the frequency block being at least one of information about a downlink bandwidth part formed with continuous resource blocks and information about an uplink bandwidth part formed with continuous resource blocks; and
a processor of the base station that configures, based on the information about the frequency block, a bandwidth of the frequency block, a subcarrier spacing of the frequency block that is different from a subcarrier spacing of another block among the plurality of blocks, and a cyclic prefix length, for the terminal, and
the terminal comprises:
a receiver that receives the RRC signaling; and
a processor of the terminal that configures, based on the information about the frequency block, the bandwidth of the frequency block, the subcarrier spacing of the frequency block, and the cyclic prefix length.

* * * * *